US012611825B2

(12) United States Patent
    Rickless et al.

(10) Patent No.:    US 12,611,825 B2
(45) Date of Patent:        Apr. 28, 2026

(54) COMPOSITE REPAIR

(71) Applicant: The Boeing Company, Arlington, VA (US)

(72) Inventors: Keenan S. Rickless, Layton, UT (US); William Brandt Majors, Glen Carbon, IL (US)

(73) Assignee: The Boeing Company, Arlington, VA (US)

( * ) Notice: Subject to any disclaimer, the term of this patent is extended or adjusted under 35 U.S.C. 154(b) by 166 days.

(21) Appl. No.: 18/466,157

(22) Filed: Sep. 13, 2023

(65) Prior Publication Data

US 2025/0083400 A1        Mar. 13, 2025

(51) Int. Cl.
     B29C 73/02        (2006.01)
     B29C 70/88        (2006.01)
     B64F 5/40         (2017.01)

(52) U.S. Cl.
     CPC ............ B29C 73/025 (2013.01); B29C 70/88 (2013.01); B64F 5/40 (2017.01)

(58) Field of Classification Search
     CPC ....... B29C 73/025; B29C 70/88; B29C 73/00; B29C 73/04; B29C 73/10; B29C 73/24; B29C 73/26; B29C 2073/262; B64F 5/40; B29K 2063/00; B29K 2105/12; B29L 2031/3076; C04B 26/02
     See application file for complete search history.

(56) References Cited

U.S. PATENT DOCUMENTS

| | | | | |
|---|---|---|---|---|
| 6,385,836 | B1 * | 5/2002 | Coltrin | ................. B29C 73/025 |
| | | | | 29/402.18 |
| 9,156,240 | B2 | 10/2015 | Bertrand et al. | |
| 9,409,329 | B2 * | 8/2016 | Gandhi | .............. B29C 45/1701 |
| 11,007,726 | B2 | 5/2021 | Griess et al. | |
| 2009/0012610 | A1 * | 1/2009 | Olson | ..................... B29C 65/16 |
| | | | | 219/121.85 |
| 2013/0056672 | A1 * | 3/2013 | Johnston | ............... C22C 47/025 |
| | | | | 252/62.51 R |
| 2017/0173895 | A1 * | 6/2017 | Williams | ................ B29C 70/14 |
| 2021/0094250 | A1 | 4/2021 | Goertz et al. | |

FOREIGN PATENT DOCUMENTS

EP        3433089 B1        12/2021

OTHER PUBLICATIONS

Extended European Search Report, dated Feb. 13, 2025, regarding European Application No. 24196004.6, 7 pages.

* cited by examiner

*Primary Examiner* — Abbas Rashid
*Assistant Examiner* — Caroline Beha
(74) *Attorney, Agent, or Firm* — Yee & Associates, P.C.

(57)        ABSTRACT

A composite structure and methods are presented. A method of performing a composite repair is presented. A fiber mixture is forced through a composite structure and into a void of the composite structure, the fiber mixture comprising an adhesive and a plurality of electromagnetically steerable fibers. An electromagnetic field is applied to the fiber mixture within the void of the composite structure. The adhesive of the fiber mixture is cured to form the composite repair with structural capabilities.

20 Claims, 11 Drawing Sheets

800

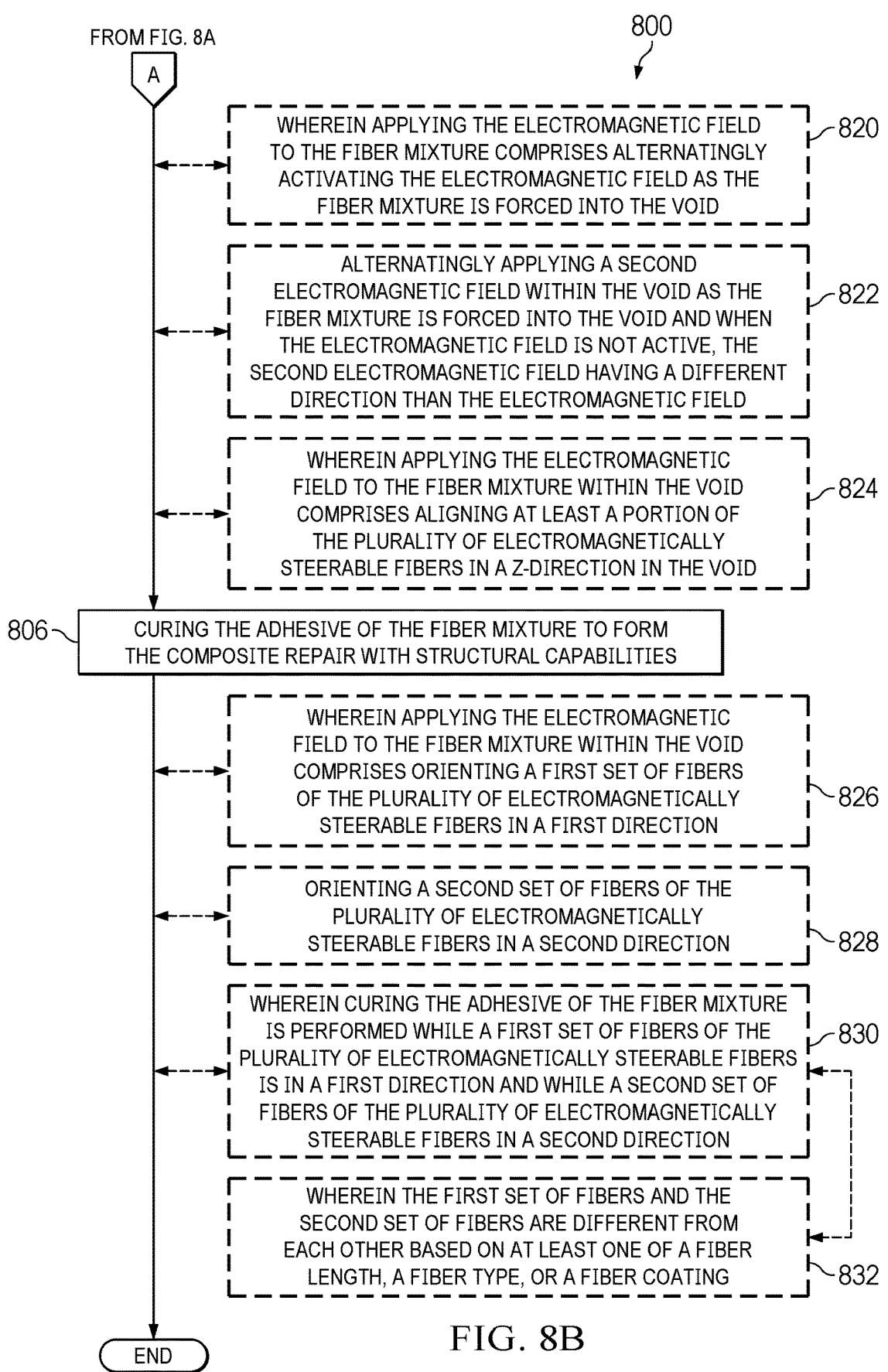

FROM FIG. 8A

A

800

WHEREIN APPLYING THE ELECTROMAGNETIC FIELD
TO THE FIBER MIXTURE COMPRISES ALTERNATINGLY
ACTIVATING THE ELECTROMAGNETIC FIELD AS THE
FIBER MIXTURE IS FORCED INTO THE VOID ⌐820

ALTERNATINGLY APPLYING A SECOND
ELECTROMAGNETIC FIELD WITHIN THE VOID AS THE
FIBER MIXTURE IS FORCED INTO THE VOID AND WHEN
THE ELECTROMAGNETIC FIELD IS NOT ACTIVE, THE
SECOND ELECTROMAGNETIC FIELD HAVING A DIFFERENT
DIRECTION THAN THE ELECTROMAGNETIC FIELD ⌐822

WHEREIN APPLYING THE ELECTROMAGNETIC
FIELD TO THE FIBER MIXTURE WITHIN THE VOID
COMPRISES ALIGNING AT LEAST A PORTION OF
THE PLURALITY OF ELECTROMAGNETICALLY
STEERABLE FIBERS IN A Z-DIRECTION IN THE VOID ⌐824

806 ⌐ CURING THE ADHESIVE OF THE FIBER MIXTURE TO FORM
THE COMPOSITE REPAIR WITH STRUCTURAL CAPABILITIES

WHEREIN APPLYING THE ELECTROMAGNETIC
FIELD TO THE FIBER MIXTURE WITHIN THE VOID
COMPRISES ORIENTING A FIRST SET OF FIBERS
OF THE PLURALITY OF ELECTROMAGNETICALLY
STEERABLE FIBERS IN A FIRST DIRECTION ⌐826

ORIENTING A SECOND SET OF FIBERS OF THE
PLURALITY OF ELECTROMAGNETICALLY
STEERABLE FIBERS IN A SECOND DIRECTION ⌐828

WHEREIN CURING THE ADHESIVE OF THE FIBER MIXTURE
IS PERFORMED WHILE A FIRST SET OF FIBERS OF THE
PLURALITY OF ELECTROMAGNETICALLY STEERABLE FIBERS
IS IN A FIRST DIRECTION AND WHILE A SECOND SET OF
FIBERS OF THE PLURALITY OF ELECTROMAGNETICALLY
STEERABLE FIBERS IN A SECOND DIRECTION ⌐830

WHEREIN THE FIRST SET OF FIBERS AND THE
SECOND SET OF FIBERS ARE DIFFERENT FROM
EACH OTHER BASED ON AT LEAST ONE OF A FIBER
LENGTH, A FIBER TYPE, OR A FIBER COATING ⌐832

END

FIG. 8B

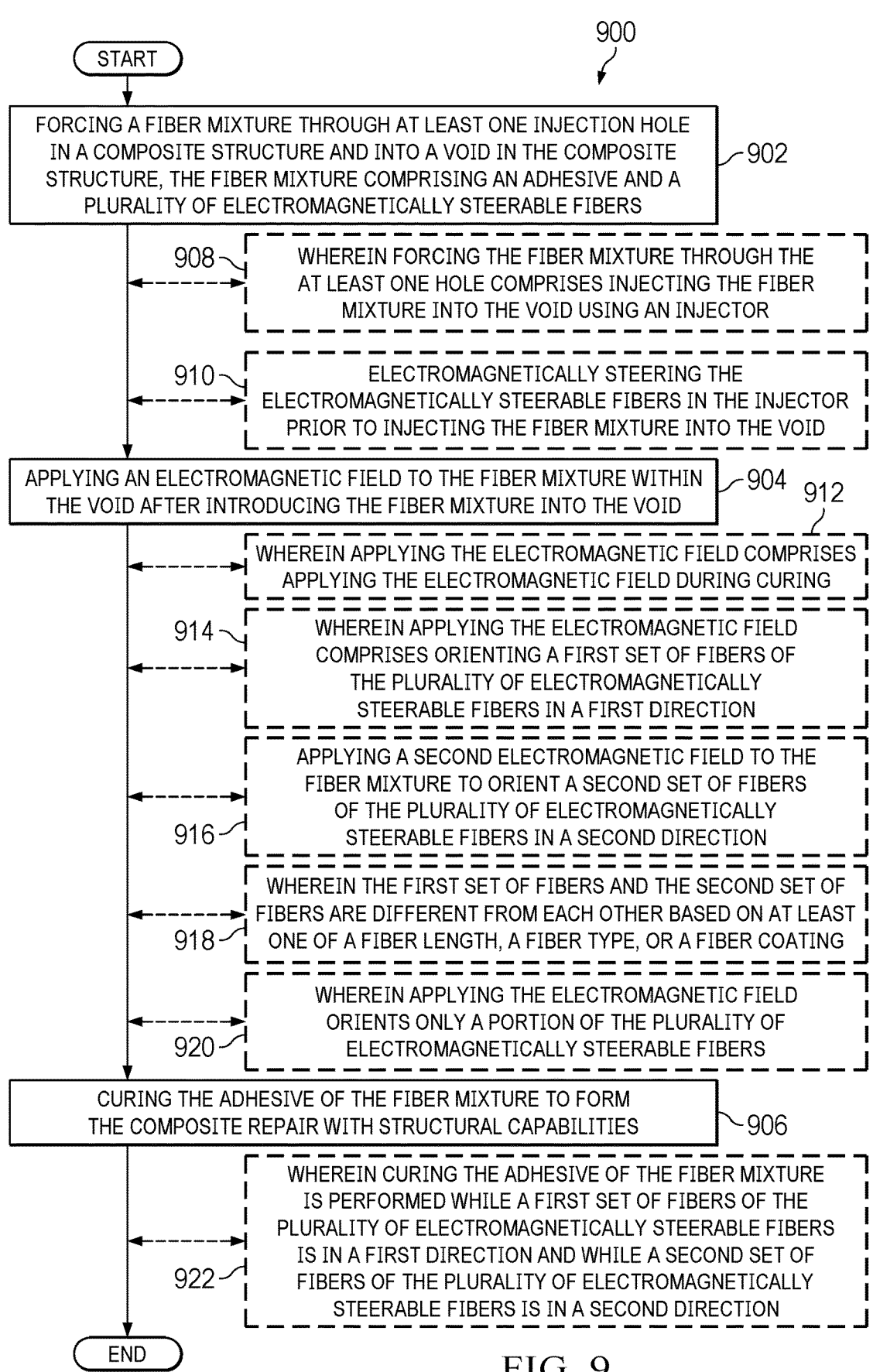

900

START

FORCING A FIBER MIXTURE THROUGH AT LEAST ONE INJECTION HOLE IN A COMPOSITE STRUCTURE AND INTO A VOID IN THE COMPOSITE STRUCTURE, THE FIBER MIXTURE COMPRISING AN ADHESIVE AND A PLURALITY OF ELECTROMAGNETICALLY STEERABLE FIBERS ⟋902

908 ⟍ WHEREIN FORCING THE FIBER MIXTURE THROUGH THE AT LEAST ONE HOLE COMPRISES INJECTING THE FIBER MIXTURE INTO THE VOID USING AN INJECTOR

910 ⟍ ELECTROMAGNETICALLY STEERING THE ELECTROMAGNETICALLY STEERABLE FIBERS IN THE INJECTOR PRIOR TO INJECTING THE FIBER MIXTURE INTO THE VOID

APPLYING AN ELECTROMAGNETIC FIELD TO THE FIBER MIXTURE WITHIN THE VOID AFTER INTRODUCING THE FIBER MIXTURE INTO THE VOID ⟋904   912

WHEREIN APPLYING THE ELECTROMAGNETIC FIELD COMPRISES APPLYING THE ELECTROMAGNETIC FIELD DURING CURING

914 ⟍ WHEREIN APPLYING THE ELECTROMAGNETIC FIELD COMPRISES ORIENTING A FIRST SET OF FIBERS OF THE PLURALITY OF ELECTROMAGNETICALLY STEERABLE FIBERS IN A FIRST DIRECTION

APPLYING A SECOND ELECTROMAGNETIC FIELD TO THE FIBER MIXTURE TO ORIENT A SECOND SET OF FIBERS OF THE PLURALITY OF ELECTROMAGNETICALLY STEERABLE FIBERS IN A SECOND DIRECTION 916 ⟋

WHEREIN THE FIRST SET OF FIBERS AND THE SECOND SET OF FIBERS ARE DIFFERENT FROM EACH OTHER BASED ON AT LEAST ONE OF A FIBER LENGTH, A FIBER TYPE, OR A FIBER COATING 918 ⟋

WHEREIN APPLYING THE ELECTROMAGNETIC FIELD ORIENTS ONLY A PORTION OF THE PLURALITY OF ELECTROMAGNETICALLY STEERABLE FIBERS 920 ⟋

CURING THE ADHESIVE OF THE FIBER MIXTURE TO FORM THE COMPOSITE REPAIR WITH STRUCTURAL CAPABILITIES ⟍906

WHEREIN CURING THE ADHESIVE OF THE FIBER MIXTURE IS PERFORMED WHILE A FIRST SET OF FIBERS OF THE PLURALITY OF ELECTROMAGNETICALLY STEERABLE FIBERS IS IN A FIRST DIRECTION AND WHILE A SECOND SET OF FIBERS OF THE PLURALITY OF ELECTROMAGNETICALLY STEERABLE FIBERS IS IN A SECOND DIRECTION 922 ⟋

END

| | |
|---|---|
| 1002 | SPECIFICATION AND DESIGN |
| 1004 | MATERIAL PROCUREMENT |
| 1006 | COMPONENT AND SUBASSEMBLY MANUFACTURING |
| 1008 | SYSTEM INTEGRATION |
| 1010 | CERTIFICATION AND DELIVERY |
| 1012 | IN SERVICE |
| 1014 | MAINTENANCE AND SERVICE |

1100

AIRCRAFT

1102 — AIRFRAME     INTERIOR — 1106

SYSTEMS

| PROPULSION SYSTEM | ELECTRICAL SYSTEM |
|---|---|
| HYDRAULIC SYSTEM | ENVIRONMENTAL SYSTEM |

1108   1112     1110   1114     1104

COMPOSITE REPAIR

BACKGROUND INFORMATION

1. Field

The present disclosure relates generally to composite manufacturing and more specifically to repair of composite structures.

2. Background

Repairs of composites often have a "knock-down factor" applied. A "knock-down factor" is a calculated reduction in strength or other mechanical characteristic due to the repair. A "knock-down factor" limits the applicability of the composite part.

Different types of repairs have different "knock-down factors". Cost and complexity of composite repair is correlated to the "knock-down factor." The more complicated, more complex, and often more expensive the composite repair procedure, the lower the "knock-down factor." Composite repair with reduced "knock-down factor" results in significant increases in repair complexity, repair analysis, and cost.

Therefore, it would be desirable to have a method and apparatus that takes into account at least some of the issues discussed above, as well as other possible issues. For example, it would be desirable to present new composite repair methods with a reduced complexity and reduced "knock-down factor".

SUMMARY

An example of the present disclosure provides a method of performing a composite repair. A fiber mixture is forced through a composite structure and into a void of the composite structure. The fiber mixture comprises an adhesive and a plurality of electromagnetically steerable fibers. An electromagnetic field is applied to the fiber mixture within the void of the composite structure. The adhesive of the fiber mixture is cured to form the composite repair with structural capabilities.

Another example of the present disclosure provides a method of performing a composite repair. A fiber mixture is forced through at least one injection hole in a composite structure and into a void in the composite structure. The fiber mixture comprises an adhesive and a plurality of electromagnetically steerable fibers. An electromagnetic field is applied to the fiber mixture within the void after introducing the fiber mixture into the void. The adhesive of the fiber mixture is cured to form the composite repair with structural capabilities.

Yet another example of the present disclosure provides a composite structure with a composite repair having structural capabilities. The composite structure comprises a plurality of cured composite plies with a void creating a separation within the plurality of cured composite plies; a number of injection holes connecting the void to an exterior of the plurality of cured composite plies; and a cured resin with a plurality of electromagnetically steerable fibers within the separation forming the composite repair and configured to transmit forces to composite plies in contact with the composite repair.

The features and functions can be achieved independently in various examples of the present disclosure or may be combined in yet other examples in which further details can be seen with reference to the following description and drawings.

BRIEF DESCRIPTION OF THE DRAWINGS

The novel features believed characteristic of the illustrative examples are set forth in the appended claims. The illustrative examples, however, as well as a preferred mode of use, further objectives and features thereof, will best be understood by reference to the following detailed description of an illustrative example of the present disclosure when read in conjunction with the accompanying drawings, wherein:

FIGS. 8A and 8B are a flowchart of a method of performing a composite repair in accordance with an illustrative example;

FIG. 9 is a flowchart of a method of performing a composite repair in accordance with an illustrative example;

DETAILED DESCRIPTION

Figure 1:
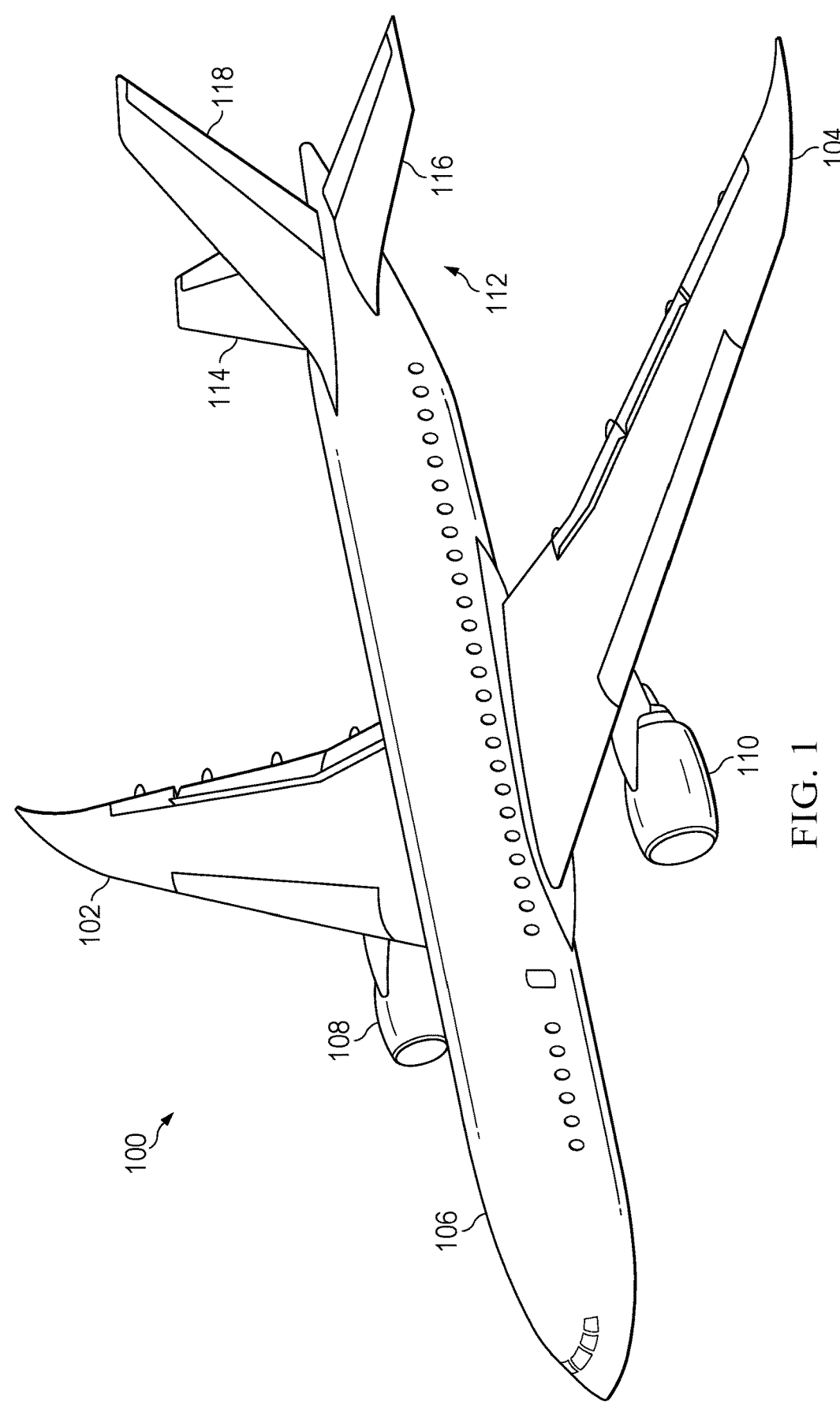
FIG. 1 is an illustration of an aircraft in accordance with an illustrative example.

The illustrative examples take into account one or more different considerations. For example, the illustrative examples recognize and take into account that a delamination is a breakdown between the layers of the composite causing the layers to disbond from each other. A delamination can cause a void in a composite structure. The illustrative examples take into account that a void could also be created in the composite structure in other ways during manufacturing. The illustrative examples take into account that a void in a composite structure may be accessible from the edge of the composite structure. In some examples, a void is contained within the composite structure and is not accessible from the edge or exterior of the composite structure.

The illustrative examples take into account that there are several conventional types of composite delamination responses. Scarf and patch composite repairs include mechanical removal of the delamination and laying up of matching layers of composite material. The mechanical removal is typically performed by sanding, resulting in debris. A taper ratio is used, so a significant amount of "good" material is also removed in order to remove the delamination.

In scarf and patch composite repairs, a patch is manufactured to match the material that was removed. The removal and patch layup process is time consuming and materials may be of significant cost. Patches may be mechanically removed and replaced again if not placed correctly during repair.

The illustrative examples take into account that another conventional delamination response is an encircle process. In an encircle process, mechanical clamp-up forces are used to prevent a delamination from growing in size. By encircling a delamination with fasteners, a "compression zone" is formed that the delamination will struggle to propagate through. An encircle includes the introduction of additional holes and only mitigates a delamination, without repair.

The illustrative examples take into account that another delamination repair is an injection repair. The standard material used for injection repairs is a 2-part resin that is mixed and injected immediately and then left to cure. Injection repair is the easiest and cheapest means of repair for a delamination. Holes may be drilled to aid access to the delamination in the part. Adhesive is then injected into the holes to fill the delamination. The goal of injection is to prevent the delamination from growing further by filling the "void" created. Without access into the delamination, surface preparation isn't possible, and the mechanical properties of the cured resin may not be known or consistent.

The illustrative examples take into account that injection repairs may be considered superficial repairs. Injection repairs may be considered to carry no structural load. Injection repairs may therefore have a high knockdown factor.

The illustrative examples take into account that by improving the structural capabilities of the injection repair, one may be able to prevent significant increases in repair cost and complexity. The illustrative examples take into account that to improve the structural capabilities of a composite repair, the mechanical capabilities of the repair material can be improved. The illustrative examples take into account that if the mechanical properties of the repair are improved, the subsequent "knock-down" will be reduced.

Turning now to FIG. 1, an illustration of an aircraft is depicted in accordance with an illustrative example. Aircraft 100 has wing 102 and wing 104 attached to body 106. Aircraft 100 includes engine 108 attached to wing 102 and engine 110 attached to wing 104.

Body 106 has tail section 112. Horizontal stabilizer 114, horizontal stabilizer 116, and vertical stabilizer 118 are attached to tail section 112 of body 106.

Aircraft 100 is an example of an aircraft that can have composite parts with composite repairs. Aircraft 100 is an example of an aircraft that can have a composite part that is repaired using the methods of the illustrative examples. At least one of body 106, wing 102, or wing 104 can have a composite repair with a fiber mixture to provide structural capabilities.

Figure 2:
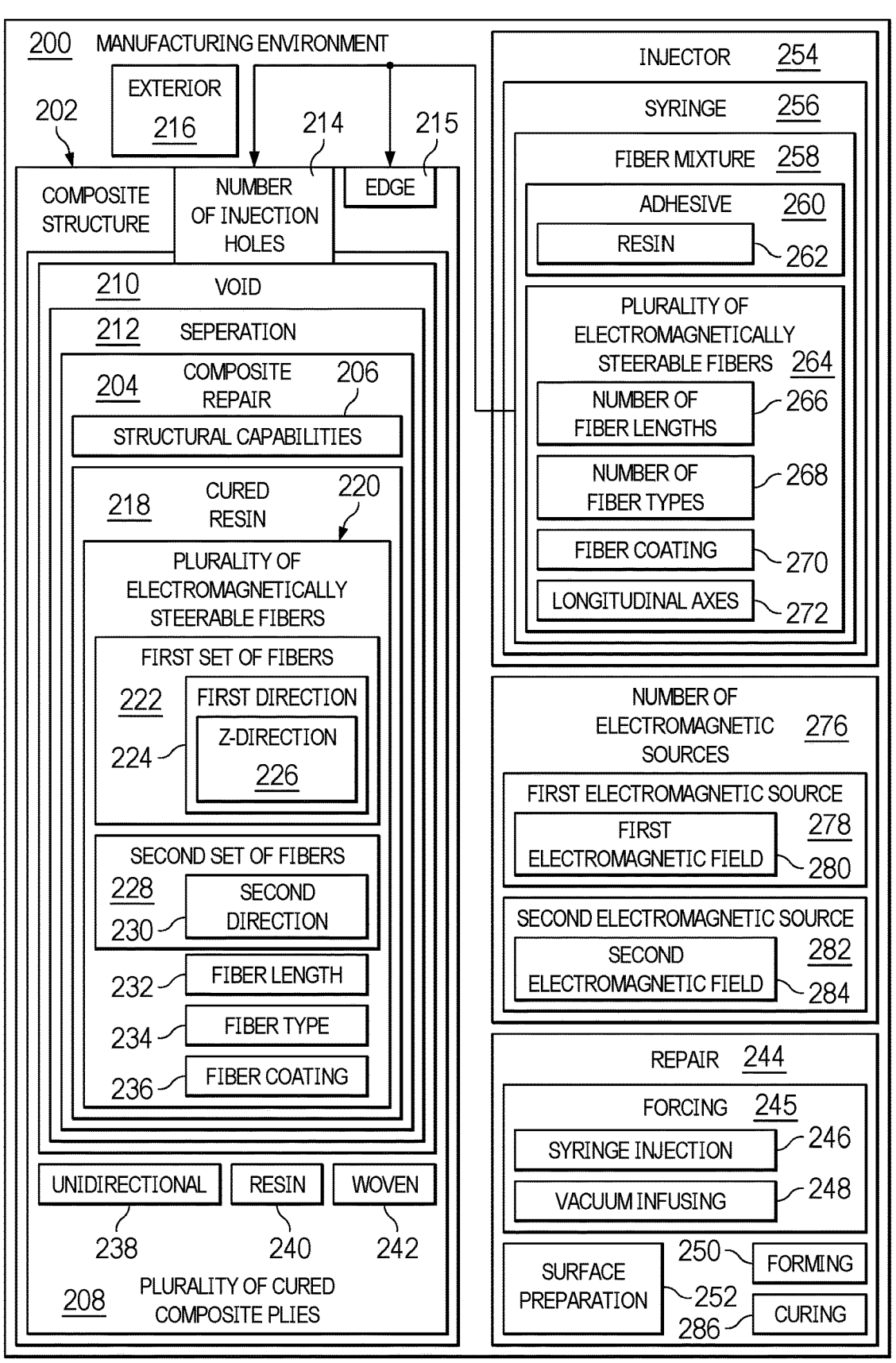
FIG. 2 is an illustration of a block diagram of a manufacturing environment in accordance with an illustrative example.

Turning now to FIG. 2, an illustration of a block diagram of a manufacturing environment is depicted in accordance with an illustrative example. Composite structure 202 can be repaired in manufacturing environment 200. Composite structure 202 can be a part of aircraft 100 of FIG. 1. Composite structure 202 has composite repair 204 having structural capabilities 206. Composite structure 202 comprises plurality of cured composite plies 208 with void 210 creating separation 212 within plurality of cured composite plies 208. In some illustrative examples, composite structure 202 comprises number of injection holes 214 connecting the void 210 to exterior 216 of plurality of cured composite plies 208. Composite structure 202 further comprises cured resin 218 with plurality of electromagnetically steerable fibers 220 within separation 212 forming composite repair 204 and configured to transmit forces to composite plies in contact with composite repair 204. In some illustrative examples, composite repair 204 is configured to transmit forces to complete composite plies in contact with composite repair 204. In some illustrative examples, composite repair 204 is configured to transmit forces to undamaged composite plies in contact with composite repair 204. In some illustrative examples, composite repair 204 transmits forces through lap shear. In some illustrative examples, composite repair 204 is configured to transmit forces to surfaces to which it's adhering.

Void 210 is a three-dimensional space within composite structure 202. Dimensions and edges of void 210 are not completely known.

Plurality of cured composite plies 208 comprises resin 240 reinforced fiber plies. Each ply of plurality of cured composite plies is one of unidirectional 238 or woven 242.

Unlike conventional processes, composite repair 204 does not have fiber orientations configured to match plurality of cured composite plies 208. Composite repair 204 comprises plurality of electromagnetically steerable fibers 220 that are oriented in directions independent of respective ply angles of plurality of cured composite plies 208. Composite repair 204 is a three-dimensional fiber reinforced material within void 210. Directions of plurality of electromagnetically steerable fibers 220, such as first direction 224 or second direction 230, are independent of angles of fibers in plurality of cured composite plies 208, which are unidirectional 238 or woven 242.

Plurality of electromagnetically steerable fibers 220 can have any desirable orientation within composite repair 204. In some illustrative examples, each of plurality of electromagnetically steerable fibers 220 has approximately the same orientation. In some illustrative examples, plurality of electromagnetically steerable fibers 220 comprises more than one orientation.

Plurality of electromagnetically steerable fibers 220 has any desirable fiber length 232, fiber type 234, or fiber coating 236. Fiber length 232 can affect the movability of plurality of electromagnetically steerable fibers 220 within cured resin 218 prior to curing. Fiber type 234 can influence movement by electromagnetic fields generated by number of electromagnetic sources 276. In some illustrative examples, fiber coating 236 can be applied to plurality of electromagnetically steerable fibers 220 to modify material characteristics of plurality of electromagnetically steerable fibers 220. In some illustrative examples, fiber coating 236 can be applied to plurality of electromagnetically steerable fibers 220 to modify reactivity of plurality of electromagnetically steerable fibers 220 to electromagnetic fields.

In some illustrative examples, plurality of electromagnetically steerable fibers 220 comprises first set of fibers 222 oriented in first direction 224 relative to plurality of cured composite plies 208. In some illustrative examples, plurality of electromagnetically steerable fibers 220 comprises first set of fibers 222 oriented in Z-direction 226 relative to plurality of cured composite plies 208. Z-direction 226 is substantially perpendicular to each ply of plurality of cured composite plies 208. In some illustrative examples, Z-direction 226 extends through the thickness of composite structure 202. By extending perpendicular to plurality of cured composite plies 208, first set of fibers 222 in Z-direction 226 can transmit forces between plies of plurality of cured composite plies 208.

In some illustrative examples, plurality of electromagnetically steerable fibers 220 comprises first set of fibers 222 oriented in first direction 224 and second set of fibers 228 oriented in second direction 230. In some illustrative examples, first direction 224 and second direction 230 are different orientations within composite repair 204. In some illustrative examples, first set of fibers 222 and second set of fibers 228 are different from each other based on at least one of fiber length 232, a fiber type, or a fiber coating.

To form composite repair 204 in composite structure 202, repair 244 is performed on composite structure 202. Repair 244 includes forcing 245 fiber mixture 258 into void 210 in composite structure 202. Fiber mixture 258 can be forced into void 210 in any desirable method. In some illustrative examples, forcing 245 in repair 244 includes one of syringe injection 246 or vacuum infusing 248. After forcing 245 fiber mixture 258 into void 210, curing 286 is performed on fiber mixture 258 to form composite repair 204. Fiber mixture 258 forced into void 210 is cured to form composite repair 204 with cured resin 218 and plurality of electromagnetically steerable fibers 220.

In some illustrative examples, prior to syringe injection 246 or vacuum infusing 248, forming 250 of number of injection holes 214 such as by drilling, cutting, boring, etc. can be performed on composite structure 202. Forming 250 can be performed by a drill, a hole saw, a reamer, a counterbore, or any other desirable tool. Number of injection holes 214 extends into void 210, providing communication between exterior of composite structure 202 and void 210. In some illustrative examples, void 210 extends to edge 215 of composite structure 202 and is open to exterior 216 of composite structure 202.

Injector 254 can be used to inject fiber mixture 258 into void 210 via number of injection holes 214 or edge 215. In some illustrative examples, injector 254 takes the form of syringe 256. In these illustrative examples, fiber mixture 258 is present in injector 254. Fiber mixture 258 comprises adhesive 260 and plurality of electromagnetically steerable fibers 264. In some illustrative examples, adhesive 260 takes the form of resin 262. In some illustrative examples, adhesive 260 takes the form of an epoxy or any other desirable type of adhesive.

Plurality of electromagnetically steerable fibers 264 has number of fiber lengths 266 and number of fiber types 268. Number of fiber types 268 includes any desirable types of fibers such as carbon fibers, carbon nanotubes, graphite fibers, boron fibers, aramid fibers, glass fibers, metal fibers, wood or other natural fibers, and/or other materials. In some illustrative examples, plurality of electromagnetically steerable fibers 264 comprises fiber coating 270. In some illustrative examples, when present, fiber coating 270 aids in adhesion and/or electromagnetic sensitivity.

Plurality of electromagnetically steerable fibers 264 is selected for number of fiber lengths 266 and quantity such that fiber mixture 258 can be applied through injection or another desirable method. The quantity of fibers in plurality of electromagnetically steerable fibers 264 in fiber mixture 258 is sufficient to provide a mechanical benefit in composite repair 204. The quantity of fibers in plurality of electromagnetically steerable fibers 264 is low enough such that a viscosity of fiber mixture 258 is low enough for forcing 245 fiber mixture 258 through composite structure 202 and into void 210. In some illustrative examples, the quantity of fibers in plurality of electromagnetically steerable fibers 264 is low enough such that a viscosity of fiber mixture 258 is low enough to fill void 210.

Plurality of electromagnetically steerable fibers 264 is configured to, when encompassed within an electromagnetic field, align longitudinal axes 272 of plurality of electromagnetically steerable fibers 220 with the respective electromagnetic field. In some illustrative examples, fiber type 234 enables alignment of plurality of electromagnetically steerable fibers 220. In some illustrative examples, number of fiber types 268 enables alignment of plurality of electromagnetically steerable fibers 220. In some illustrative examples, fiber coating 270 enables alignment of plurality of electromagnetically steerable fibers 220.

Number of electromagnetic sources 276 is used to orient longitudinal axes 272 of plurality of electromagnetically steerable fibers 264. In some illustrative examples, number of electromagnetic sources 276 is used to orient longitudinal axes 272 of plurality of electromagnetically steerable fibers 264 prior to forcing 245 fiber mixture 258 into void 210. In some illustrative examples, number of electromagnetic sources 276 is used to orient longitudinal axes 272 of plurality of electromagnetically steerable fibers 264 while forcing 245 fiber mixture 258 into void 210. In some illustrative examples, number of electromagnetic sources 276 is used to orient longitudinal axes 272 of plurality of electromagnetically steerable fibers 264 while fiber mixture 258 is filling void 210. In some illustrative examples, number of electromagnetic sources 276 is used to orient longitudinal axes 272 of plurality of electromagnetically steerable fibers 264 in void 210 after filling but prior to curing 286. In some illustrative examples, number of electromagnetic sources 276 is used to orient longitudinal axes 272 of plurality of electromagnetically steerable fibers 264 in void 210 during curing 286.

As depicted, number of electromagnetic sources 276 comprises first electromagnetic source 278 and second electromagnetic source 282. In some illustrative examples, first electromagnetic source 278 and second electromagnetic source 282 have different orientations relative to composite structure 202 to align fibers in different directions. In some illustrative examples, first electromagnetic source 278 and second electromagnetic source 282 have different strengths. In some illustrative examples, first electromagnetic source 278 and second electromagnetic source 282 are configured to affect different sets of plurality of electromagnetically steerable fibers 220. In some illustrative examples, first electromagnetic source 278 and second electromagnetic source 282 are configured to affect the same fibers of plurality of electromagnetically steerable fibers 220.

In some illustrative examples, first electromagnetic source 278 is configured to apply first electromagnetic field 280 to fiber mixture 258 within void 210. In some illustrative examples, first electromagnetic source 278 is configured to alternatingly apply first electromagnetic field 280 as fiber mixture 258 is forced into void 210. By alternatingly applying first electromagnetic field 280, at least a portion of plurality of electromagnetically steerable fibers 264 moves between aligned by first electromagnetic field 280 and aligned by forcing 245 fiber mixture 258.

In some illustrative examples, first electromagnetic source 278 is configured to apply first electromagnetic field 280 to fiber mixture 258 within void 210 to apply pressure to fibers lodged within void 210 as fiber mixture 258 is forced into void 210. Plurality of electromagnetically steerable fibers 264 can be oriented during forcing 245 into composite structure 202 to move around three-dimensional obstacles in void 210. Plurality of electromagnetically steerable fibers 264 can be oriented during introduction to the composite structure to break up blockages in the flow of fiber mixture 258 in void 210. Plurality of electromagnetically steerable fibers 264 can be oriented prior to or during curing 286 to provide structural capabilities 206 in composite repair 204. In some illustrative examples, first electromagnetic source 278 is configured to apply first electromagnetic field 280 to fiber mixture 258 within void 210 to increase filling of void 210 with fiber mixture 258.

In some illustrative examples, second electromagnetic source 282 is configured to apply second electromagnetic field 284 to fiber mixture 258 within void 210 as fiber mixture 258 is forced into void 210. In some illustrative examples, second electromagnetic source 282 is configured to alternatingly apply second electromagnetic field 284 to fiber mixture 258 within void 210 as fiber mixture 258 is forced into void 210 when first electromagnetic field 280 is not active. In these illustrative examples, second electromagnetic field 284 has a different direction than first electromagnetic field 280. In some illustrative examples, moving plurality of electromagnetically steerable fibers 264 alternatingly using first electromagnetic field 280 and second electromagnetic field 284 can increase movement of plurality of electromagnetically steerable fibers 264 over a single electromagnetic field of a single direction. In some illustrative examples, moving plurality of electromagnetically steerable fibers 264 alternatingly using first electromagnetic field 280 and second electromagnetic field 284 can increase pressure to fibers lodged within void 210 as fiber mixture 258 is forced into void 210.

In some illustrative examples, first electromagnetic source 278 and second electromagnetic source 282 are configured to align different sets of fibers. In some illustrative examples, first electromagnetic source 278 is configured to align first set of fibers 222 to first direction 224. In some illustrative examples, second electromagnetic source 282 is configured to align second set of fibers 228 to second direction 230 different from first direction 224.

In some illustrative examples, first electromagnetic source 278 and second electromagnetic source 282 are configured to be used during different portions of repair 244. In some illustrative examples, first electromagnetic source 278 is configured to be used during forcing 245 of fiber mixture 258 into void 210 while second electromagnetic source 282 is configured to be used during curing 286.

The illustration of manufacturing environment 200 in FIG. 2 is not meant to imply physical or architectural limitations to the manner in which an illustrative example may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative example.

For example, plurality of electromagnetically steerable fibers 220 can include only one set of fibers. In other illustrative examples, plurality of electromagnetically steerable fibers 220 can include more than two sets of fibers.

Figure 3:
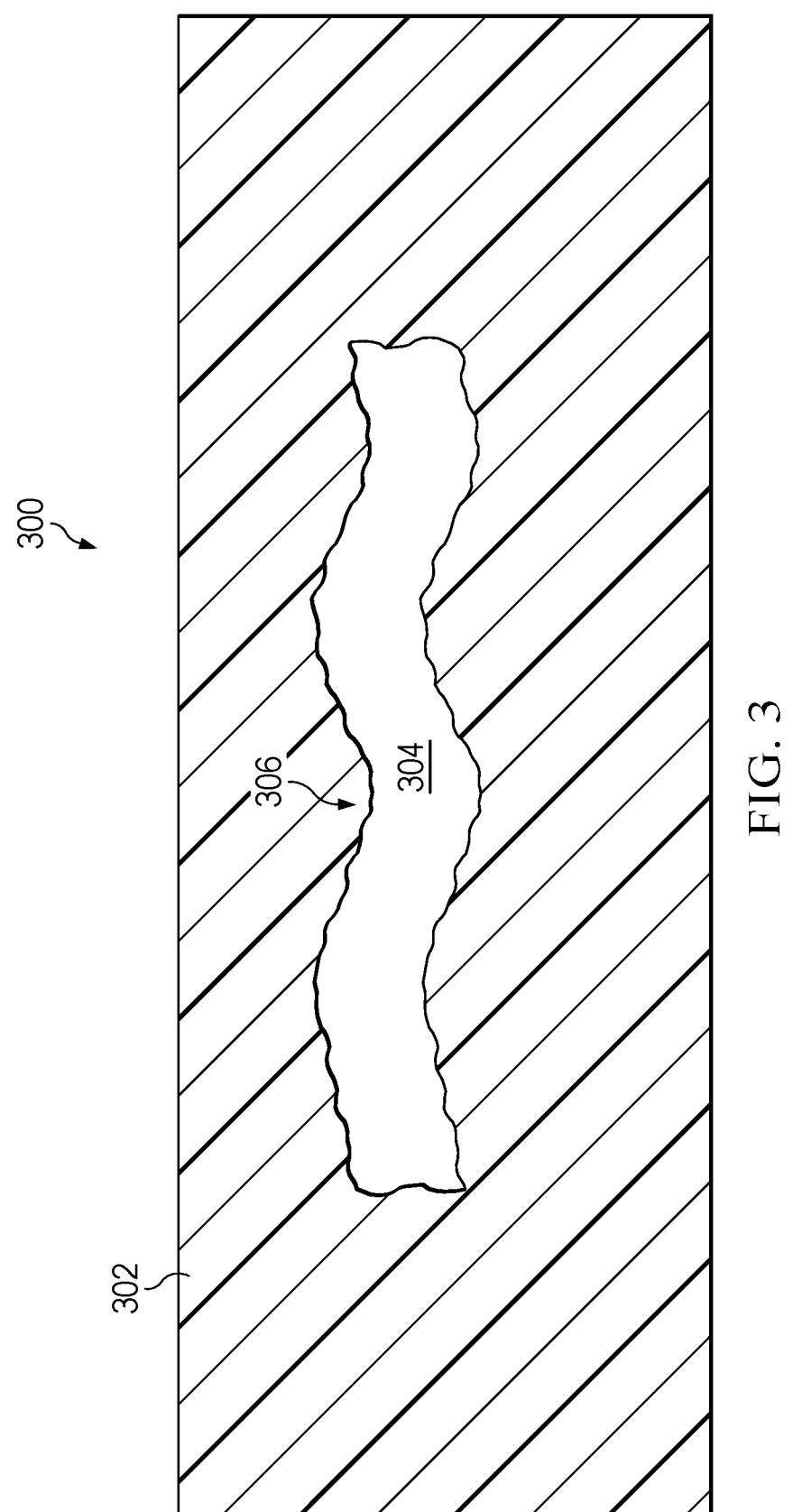
FIG. 3 is an illustration of a cross-sectional view through a void in a composite structure in accordance with an illustrative example.

Turning now to FIG. 3, an illustration of a cross-sectional view through a void in a composite structure is depicted in accordance with an illustrative example. Composite structure 300 is a physical implementation of composite structure 202 of FIG. 2. Composite structure 300 comprises plurality of cured composite plies 302 and void 304. Void 304 reduces structural properties of composite structure 300. Void 304 creates separation 306 within plurality of cured composite plies 302. Although some boundaries of void 304 can be detected through non-destructive inspection, void 304 has an unknown three-dimensional shape.

The illustration of void 304 is only depicted for discussion purposes and is not limiting. Void 304 may be exaggerated in size or shape relative to composite structure 300 and composite plies 302 for ease of discussion.

Figure 4:
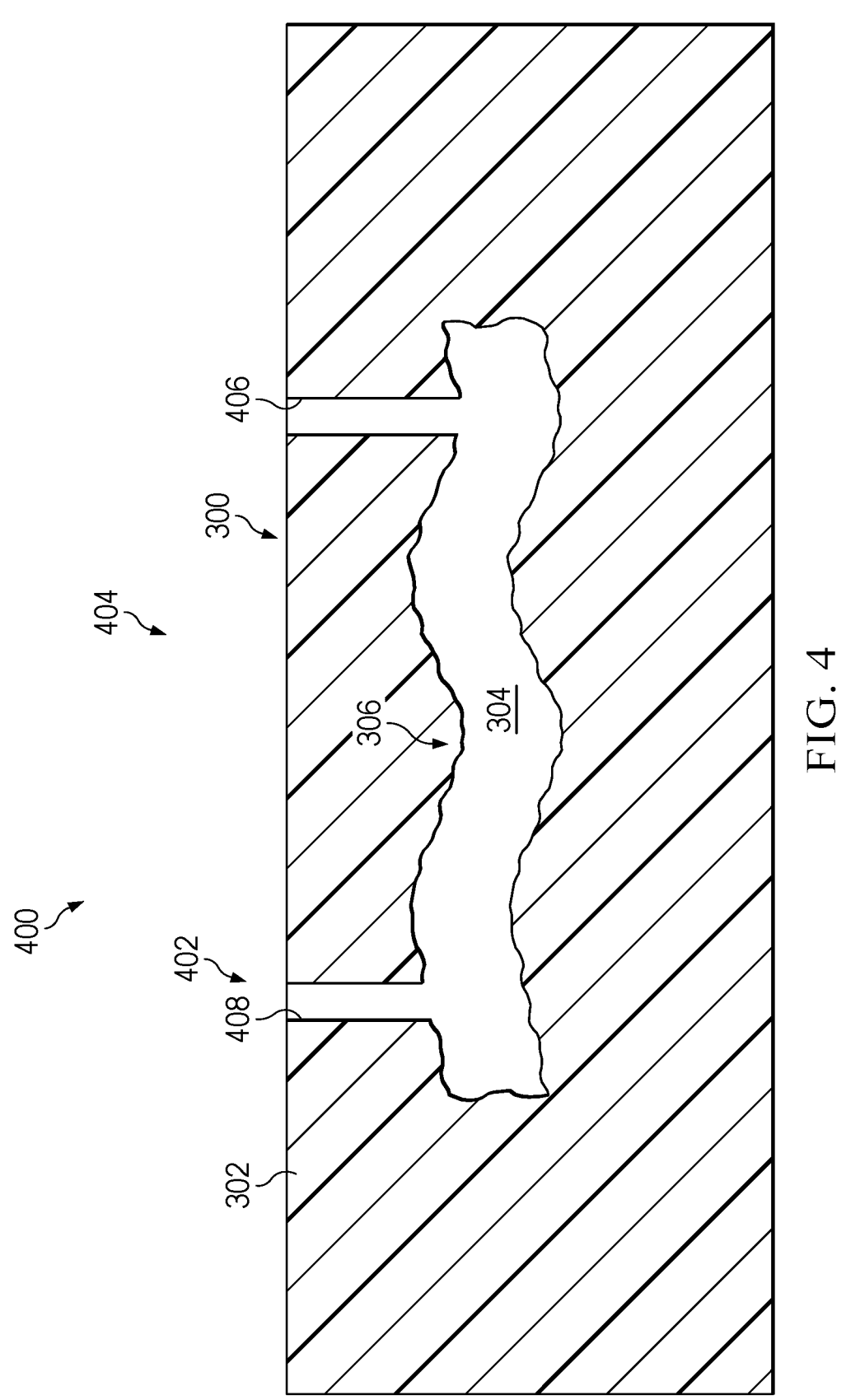
FIG. 4 is an illustration of a cross-sectional view through a composite structure with a void and a number of injection holes in accordance with an illustrative example.

Turning now to FIG. 4, an illustration of a cross-sectional view through a composite structure with a void and a number of injection holes is depicted in accordance with an illustrative example. In view 400, number of injection holes 402 has been formed in composite structure 300. In some illustrative examples, number of injection holes 402 is formed in composite structure 300 by being drilled, cut, or bored into composite structure 300. Number of injection holes 402 is formed into composite structure 300 to access void 304. Number of injection holes 402 connects void 304 to exterior 404 of plurality of cured composite plies 302. Number of injection holes 402 comprises injection hole 406 and injection hole 408.

In some illustrative examples, a vacuum injection procedure can be performed using number of injection holes 402. In some illustrative examples, a syringe injection can be performed using number of injection holes 402.

Figure 5:
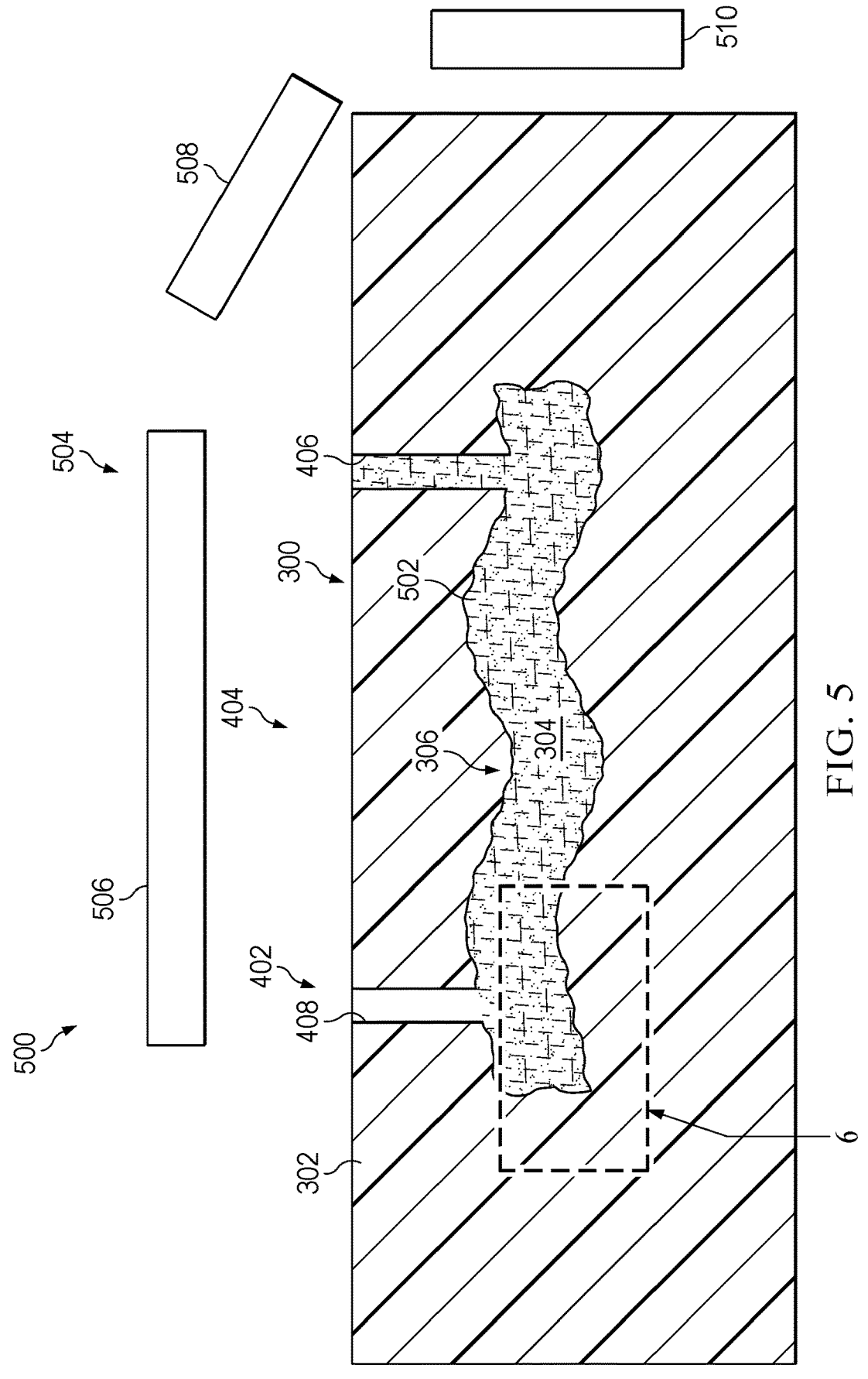
FIG. 5 is an illustration of a cross-sectional view through a composite structure with a composite repair in accordance with an illustrative example.

Turning now to FIG. 5, an illustration of a cross-sectional view through a composite structure with a composite repair is depicted in accordance with an illustrative example. View 500 is a view of composite structure 300 with composite repair 502. Composite repair 502 is formed within separation 306.

Composite repair 502 has structural capabilities. Composite repair 502 comprises a cured resin with a plurality of electromagnetically steerable fibers. Composite repair 502 is configured to transmit forces to composite plies in contact with composite repair 502. In some illustrative examples, composite repair 502 is configured to transmit forces to complete or undamaged composite plies in contact with composite repair 502. In some illustrative examples, composite repair 502 is configured to transmit forces into surfaces to which it is adhered.

Directions of the plurality of electromagnetically steerable fibers within composite repair can be controlled by number of electromagnetic sources 504. The locations of number of electromagnetic sources 504, the timing of usage of number of electromagnetic sources 504, and pattern of usage of number of electromagnetic sources 504 can be used to orient the plurality of electromagnetically steerable fibers.

Number of electromagnetic sources 504 is depicted relative to composite structure 300. Number of electromagnetic sources 504 can be used to control the orientation of a plurality of electromagnetically steerable fibers in composite repair 502 at least one of prior to introduction to void 304, during introduction to void 304, during filling of void 304, prior to curing, or during curing of composite repair 502. Number of electromagnetic sources 504 comprises electromagnetic sources at different angles relative to composite repair 502. By having electromagnetic sources at different angles relative to composite structure 300, number of electromagnetic sources 504 can orient a plurality of electromagnetically steerable fibers at different angles.

As depicted, number of electromagnetic sources 504 comprises electromagnetic source 506, electromagnetic source 508, and electromagnetic source 510. Electromagnetic source 506 is positioned over a top surface of composite structure 300. Electromagnetic source 508 is positioned at an angle relative to the top surface of composite structure 300. Electromagnetic source 510 is approximately perpendicular to electromagnetic source 506. Electromagnetic source 510 is positioned along a side of composite structure 300.

Electromagnetic source 506 is positioned to orient electromagnetically steerable fibers in a direction perpendicular to plurality of cured composite plies 302. A perpendicular direction relative to plurality of cured composite plies 302 can be referred to as positioned in the Z-direction. Electromagnetic source 510 is positioned to orient electromagnetically steerable fibers in a direction parallel to plurality of cured composite plies 302. Electromagnetic source 508 is positioned to orient electromagnetically steerable fibers at an angle relative to plurality of cured composite plies 302.

Orientations of fibers within composite repair 502 can be set using number of electromagnetic sources 504. As the shape of void 304 is unknown, the electromagnetically steerable fibers can become caught on edges of void 304. As the shape of void 304 is unknown, the electromagnetically steerable fibers can clump. In some illustrative examples, number of electromagnetic sources 504 can be used to create a back pressure behind a clump of fibers. In some illustrative examples, number of electromagnetic sources 504 can be used to move electromagnetically steerable fibers to dislodge the fibers from edges of the void. In some illustrative examples, number of electromagnetic sources 504 can be used to improve filling of void 304.

In some illustrative examples, selectively activating multiple electromagnetic sources of number of electromagnetic sources 504 can be used to enhance filling of void 304. In some illustrative examples, selectively activating a single electromagnetic source of number of electromagnetic sources 504 can be used to enhance filling of void 304. In some illustrative examples, electromagnetic source 510 can be used to orient fibers to flow within void 304.

In some illustrative examples, the strength of number of electromagnetic sources 504 can each be the same. In some illustrative examples, a strength of at least one electromagnetic source of number of electromagnetic sources 504 is different than the remaining electromagnetic sources of number of electromagnetic sources 504.

Number of electromagnetic sources 504 is a non-limiting example of a quantity and locations of electromagnetic sources. Any desirable quantity, size, and locations of electromagnetic sources can be present in number of electromagnetic sources 504.

Figure 6:
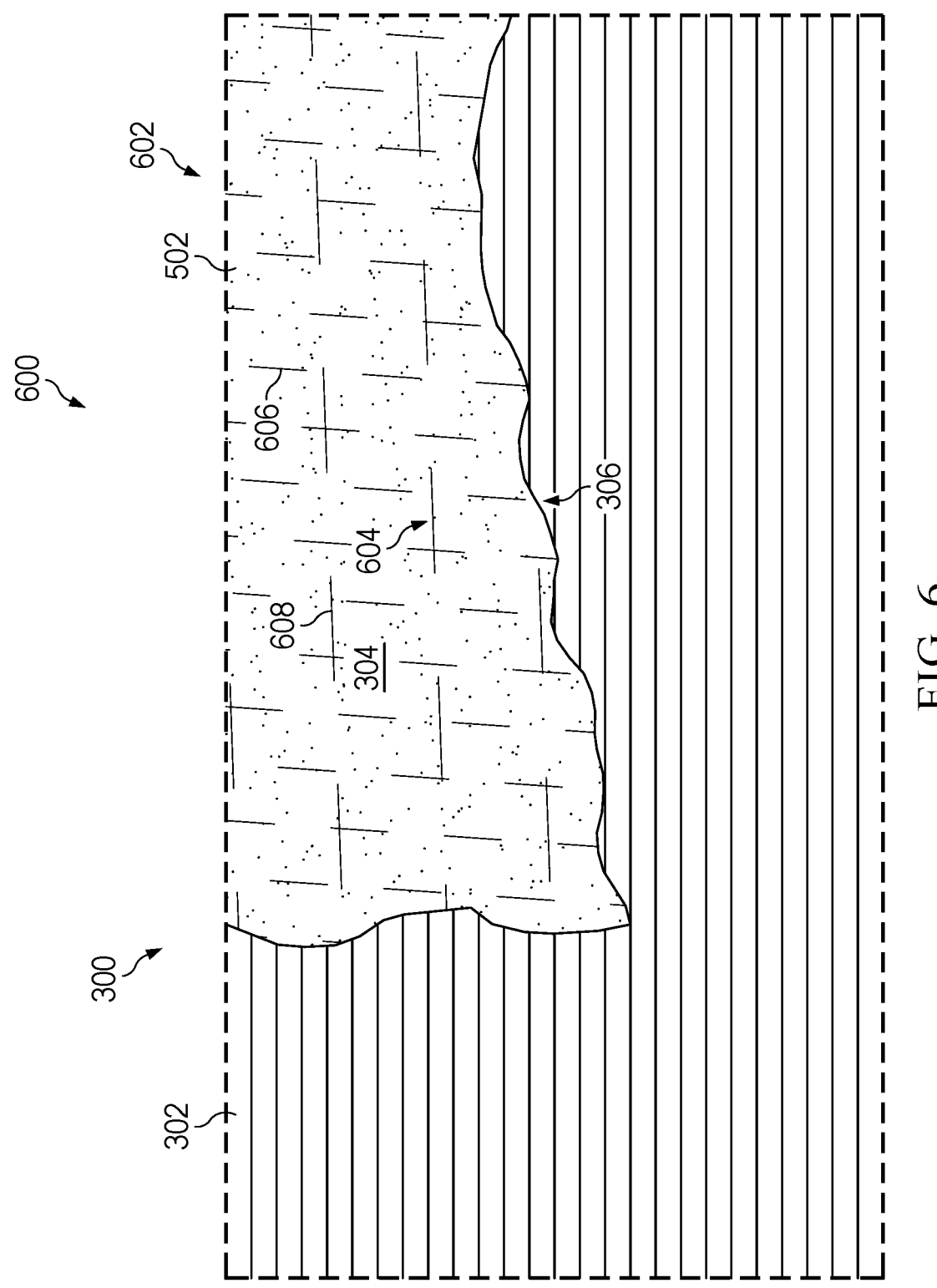
FIG. 6 is an illustration of a cross-sectional view through a composite repair in accordance with an illustrative example.

Turning now to FIG. 6, an illustration of a cross-sectional view through a composite repair is depicted in accordance with an illustrative example. View 600 is a view within composite repair 502 of FIG. 5. Composite repair 502 comprises cured resin 604 with plurality of electromagnetically steerable fibers 602. In this illustrative example, plurality of electromagnetically steerable fibers 602 comprises first set of fibers 606 and second set of fibers 608. As depicted, first set of fibers 606 and second set of fibers 608 have two different directions. As depicted, first set of fibers 606 and second set of fibers 608 have two different directions based on two different lengths of fibers. First set of fibers 606 has shorter lengths than second set of fibers 608. First set of fibers 606 is oriented in a Z-direction relative to plurality of cured composite plies 302 of composite structure 300.

In some illustrative examples, second set of fibers 608 is oriented using one of number of electromagnetic sources 504. In some illustrative examples, second set of fibers 608 is oriented by the flow of cured resin 604 prior to curing. In some illustrative examples, first set of fibers 606 is oriented using one of number of electromagnetic sources 504, such as electromagnetic source 506. In some illustrative examples, first set of fibers 606 is able to move within the resin as the resin is cured due to the size of first set of fibers 606. In some illustrative examples, second set of fibers 608 is constrained from movement during curing due to the size of second set of fibers 608. In some illustrative examples, first set of fibers 606 is selectively oriented to the Z-direction based on at least one of a difference in fiber type, fiber length, or fiber coating between first set of fibers 606 and second set of fibers 608.

FIGS. 2-6 are only one illustrative example of a composite structure with a void and a composite repair. The composite structure can have any desirable size, shape, and layup comprising any quantity or fiber angle of composite plies. The composite repair can be introduced in any desirable fashion. In some illustrative examples, a composite repair can be formed by introducing a fiber mixture comprising the resin and plurality of electromagnetically steerable fibers 602 through more than one injection hole. The composite repair can include any desirable direction of plurality of electromagnetically steerable fibers.

Figure 7:
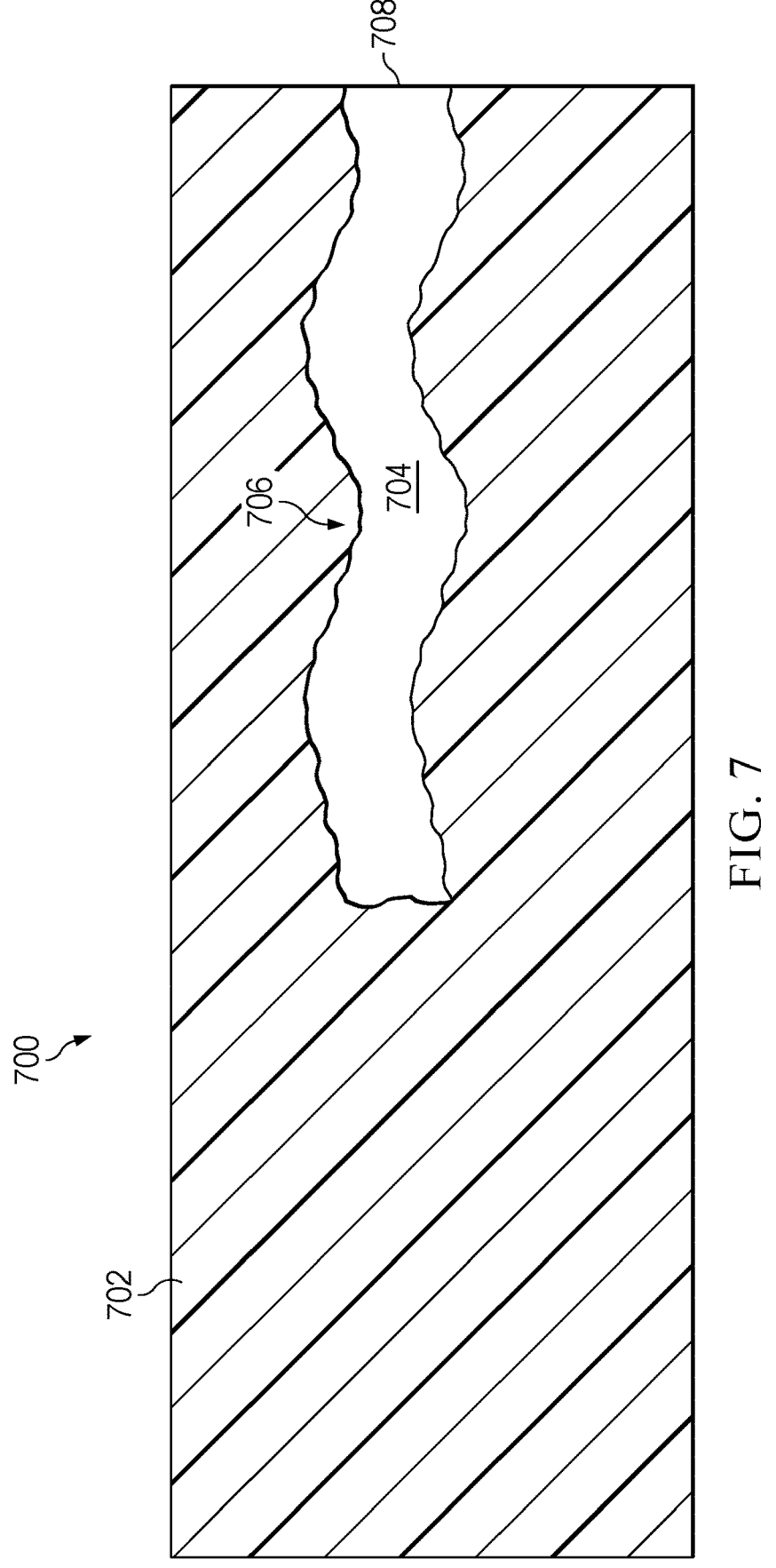
FIG. 7 is an illustration of a cross-sectional view through a void in a composite structure in accordance with an illustrative example.

Turning now to FIG. 7, an illustration of a cross-sectional view through a void in a composite structure is depicted in accordance with an illustrative example. Composite structure 700 is a physical implementation of composite structure 202 of FIG. 2. Composite structure 700 comprises plurality of cured composite plies 702 and void 704. Void 704 reduces structural properties of composite structure 700. Void 704 creates separation 706 within plurality of cured composite plies 702. In this illustrative example, void 704 is in communication with edge 708 composite structure 700.

In some illustrative examples, a composite repair can be performed on void 704 from edge 708. In some illustrative examples, a composite repair can be performed on void 704 without introducing injection holes into composite structure 700.

Figure 8A:
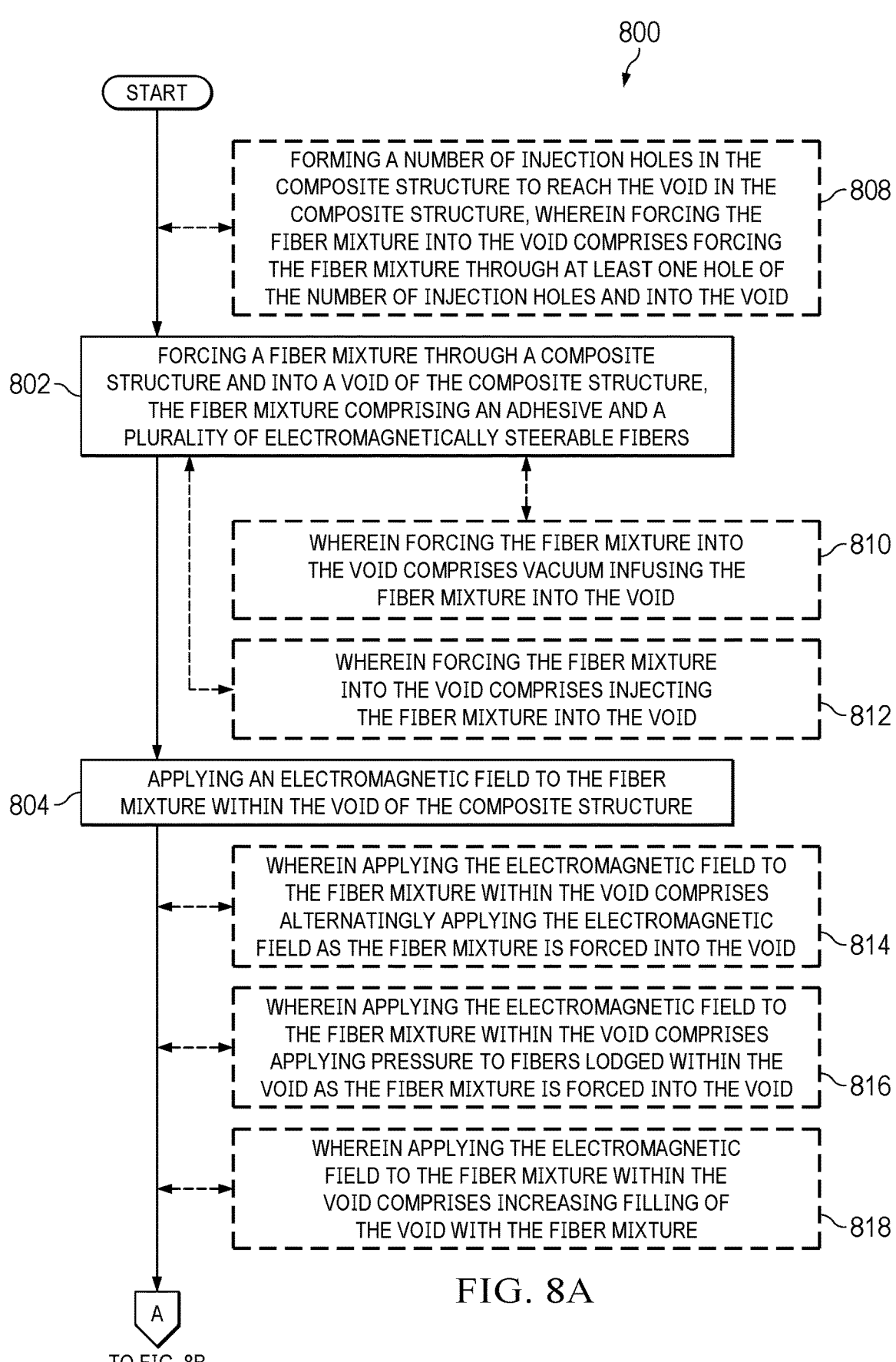

Turning now to FIGS. 8A and 8B, a flowchart of a method of performing a composite repair is depicted in accordance with an illustrative example. Method 800 can be performed to create a composite repair in a composite part of aircraft 100 of FIG. 1. Method 800 can be performed to create composite repair 204 of FIG. 2. Method 800 can be performed on composite structure 300 of FIGS. 3-6. Method 800 can be performed to form composite repair 502 of FIGS. 5-6. Method 800 can be performed on composite structure 700 to form a composite repair.

Method 800 forces a fiber mixture through a composite structure and into a void of the composite structure, the fiber mixture comprising an adhesive and a plurality of electromagnetically steerable fibers (operation 802). Method 800 applies an electromagnetic field to the fiber mixture within the void of the composite structure (operation 804). Method 800 cures the adhesive of the fiber mixture to form the composite repair with structural capabilities (operation 806). Afterwards, method 800 terminates.

In some illustrative examples, method 800 forms a number of injection holes in the composite structure to reach the void in the composite structure (operation 808). In some illustrative examples, forcing the fiber mixture into the void comprises forcing the fiber mixture through at least one hole of the number of injection holes and into the void (operation 808).

In some illustrative examples, forcing the fiber mixture into the void comprises vacuum infusing the fiber mixture into the void (operation 810). Vacuum infusing can include applying a vacuum to the void within the composite structure. The vacuum applied to the void is used to force the fiber mixture through at least one of the injection holes or an edge of the composite structure.

In some illustrative examples, forcing the fiber mixture into the void comprises injecting the fiber mixture into the void (operation 812). Injection of the fiber mixture into the void can include at least one of injecting the fiber mixture into a number of injection holes or from an edge of the composite structure. The fiber mixture can be injected using any desirable injection equipment. In some illustrative examples, the injection equipment can include a syringe.

In some illustrative examples, applying the electromagnetic field to the fiber mixture within the void comprises alternatingly applying the electromagnetic field as the fiber mixture is forced into the void (operation 814). In some illustrative examples, alternatingly applying the electromagnetic field as the fiber mixture is forced into the void increases the filling of the void. In some illustrative examples, alternatingly applying the electromagnetic field as the fiber mixture is forced into the void creates pressure behind clumps of fibers. In some illustrative examples, alternatingly applying the electromagnetic field as the fiber mixture is forced into the void reduces fibers catching on edges of the void.

In some illustrative examples, applying the electromagnetic field to the fiber mixture within the void comprises applying pressure to fibers lodged within the void as the fiber mixture is forced into the void (operation 816). In some illustrative examples, alternatingly applying a single electromagnetic field applies pressure to fibers lodged within the void. In some illustrative examples, alternatingly applying multiple electromagnetic fields having different directions applies pressure to fibers lodged within the void.

In some illustrative examples, applying the electromagnetic field to the fiber mixture within the void comprises increasing filling of the void with the fiber mixture (operation 818). In some illustrative examples applying the electromagnetic field aligns the fibers to the flow of the fiber mixture to increase filling of the void. In some illustrative examples, applying the electromagnetic field reduces clumping of fibers to increase filling of the void. In some illustrative examples, applying the electromagnetic field creates movement in the resin to increase filling of the void.

In some illustrative examples, applying the electromagnetic field to the fiber mixture comprises alternatingly activating the electromagnetic field as the fiber mixture is forced into the void (operation 820). In some illustrative examples, method 800 alternatingly applies a second electromagnetic field within the void as the fiber mixture is forced into the void and when the electromagnetic field is not active, the second electromagnetic field having a different direction than the electromagnetic field (operation 822).

In some illustrative examples, applying the electromagnetic field to the fiber mixture within the void comprises aligning at least a portion of the plurality of electromagnetically steerable fibers in a Z-direction in the void (operation 824).

In some illustrative examples, applying the electromagnetic field to the fiber mixture within the void comprises orienting a first set of fibers of the plurality of electromagnetically steerable fibers in a first direction (operation 826). In some illustrative examples, method 800 orients a second set of fibers of the plurality of electromagnetically steerable fibers in a second direction (operation 828).

In some illustrative examples, curing the adhesive of the fiber mixture is performed while a first set of fibers of the plurality of electromagnetically steerable fibers is in a first direction and while a second set of fibers of the plurality of electromagnetically steerable fibers is in a second direction (operation 830). In some illustrative examples, the first set of fibers and the second set of fibers are different from each other based on at least one of a fiber length, a fiber type, or a fiber coating (operation 832). By being different from each other based on at least one of a fiber length, a fiber type, or a fiber coating, the first set of fibers and the second set of fibers can be acted upon differently by electromagnetic fields. In some illustrative examples, the difference of at least one of a fiber length, a fiber type, or a fiber coating can allow for selective alignment of one of the first set of fibers or the second set of fibers.

Turning now to FIG. 9, a flowchart of a method of performing a composite repair is depicted in accordance with an illustrative example. Method 900 can be performed to form a composite repair in a component of aircraft 100 of FIG. 1. Method 900 can be performed to form composite repair 204 of FIG. 2. Method 900 can be performed to repair void 304 in composite structure 300 of FIGS. 3-6.

Method 900 forces a fiber mixture through at least one injection hole in a composite structure and into a void in the composite structure, the fiber mixture comprising an adhesive and a plurality of electromagnetically steerable fibers (operation 902). Method 900 applies an electromagnetic field to the fiber mixture within the void after introducing the fiber mixture into the void (operation 904). Method 900 cures the adhesive of the fiber mixture to form the composite repair with structural capabilities (operation 906). Afterwards, method 900 terminates.

In some illustrative examples, forcing the fiber mixture through the at least one hole comprises injecting the fiber mixture into the void using an injector (operation 908). In some illustrative examples, the injector comprises a pneumatic or mechanical injector. In some illustrative examples, the injector is a vacuum injector. In some illustrative examples, the injector is a syringe. In some illustrative examples, method 900 electromagnetically steers the electromagnetically steerable fibers in the injector prior to injecting the fiber mixture into the void (operation 910). In some illustrative examples, an electromagnetic field is applied to the electromagnetically steerable fibers in the injector to align the electromagnetically steerable fibers in the direction of the desired flow from the injector. In some illustrative examples, an electromagnetic field is applied to the electromagnetically steerable fibers in the injector to align the electromagnetically steerable fibers parallel to a nozzle of the injector. In some illustrative examples, the electromagnetically steerable fibers are oriented prior to introduction to the void to aid in reducing the viscosity of the fiber mixture.

In some illustrative examples, applying the electromagnetic field comprises applying the electromagnetic field during curing (operation 912). In some illustrative examples, the electromagnetic field is applied during curing to maintain a desired direction of at least one set of electromagnetically steerable fibers. In some illustrative examples, the electromagnetic field is applied during curing to align electromagnetically steerable fibers in a Z-direction.

In some illustrative examples, applying the electromagnetic field comprises orienting a first set of fibers of the plurality of electromagnetically steerable fibers in a first direction (operation 914). In some illustrative examples, method 900 applies a second electromagnetic field to the fiber mixture to orient a second set of fibers of the plurality of electromagnetically steerable fibers in a second direction (operation 916). In some illustrative examples, the first set of fibers and the second set of fibers are different from each other based on at least one of a fiber length, a fiber type, or a fiber coating (operation 918). In some illustrative examples, applying the electromagnetic field orients only a portion of the plurality of electromagnetically steerable fibers (operation 920).

In some illustrative examples, curing the adhesive of the fiber mixture is performed while a first set of fibers of the plurality of electromagnetically steerable fibers is in a first direction and while a second set of fibers of the plurality of electromagnetically steerable fibers is in a second direction (operation 922). In some illustrative examples, one of the first direction or the second direction is based on the flow of the fiber mixture in filling the void. In some illustrative examples, each of the first direction and the second direction is an alignment based on a respective electromagnetic source.

As used herein, the phrase "at least one of," when used with a list of items, means different combinations of one or more of the listed items may be used and only one of each item in the list may be needed. For example, "at least one of item A, item B, or item C" may include, without limitation, item A, item A and item B, or item B. This example also may include item A, item B, and item C or item B and item C. Of course, any combinations of these items may be present. In other examples, "at least one of" may be, for example, without limitation, two of item A; one of item B; and ten of item C; four of item B and seven of item C; or other suitable combinations. The item may be a particular object, thing, or a category. In other words, at least one of means any combination of items and number of items may be used from the list but not all of the items in the list are required.

As used herein, "a number of," when used with reference to items means one or more items.

The flowcharts and block diagrams in the different depicted examples illustrate the architecture, functionality, and operation of some possible implementations of apparatuses and methods in an illustrative example. In this regard, each block in the flowcharts or block diagrams may represent at least one of a module, a segment, a function, or a portion of an operation or step.

In some alternative implementations of an illustrative example, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram. Some blocks may be optional. For example, operation 808 through operation 832 may be optional. For example, operation 908 through operation 922 may be optional.

Figures 10, 11:
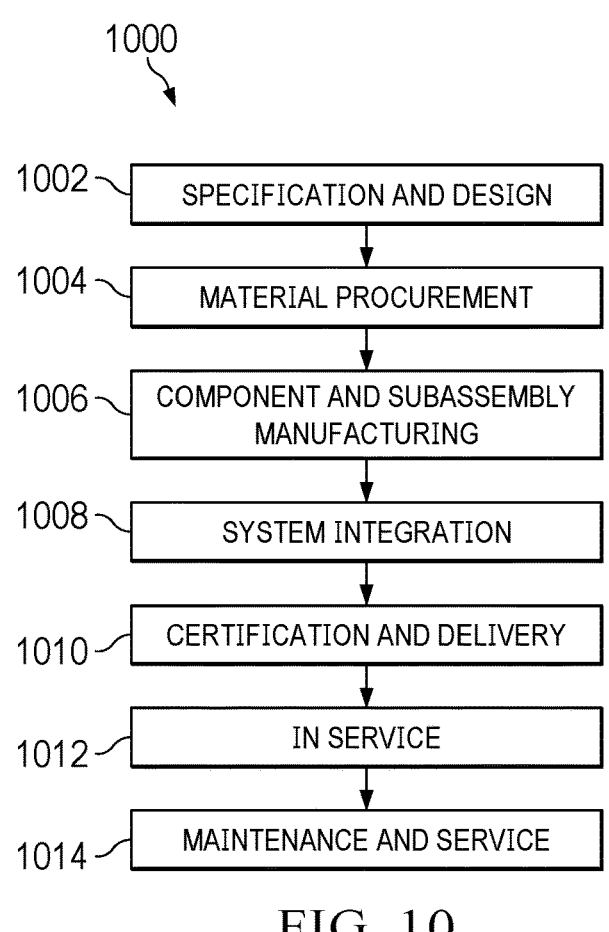
FIG. 10 is an illustration of an aircraft manufacturing and service method in a form of a block diagram in accordance with an illustrative example.
FIG. 11 is an illustration of an aircraft in a form of a block diagram in which an illustrative example may be implemented.

Illustrative examples of the present disclosure may be described in the context of aircraft manufacturing and service method 1000 as shown in FIG. 10 and aircraft 1100 as shown in FIG. 11. Turning first to FIG. 10, an illustration of an aircraft manufacturing and service method in a form of a block diagram is depicted in accordance with an illustrative example. During pre-production, aircraft manufacturing and service method 1000 may include specification and design 1002 of aircraft 1100 in FIG. 11 and material procurement 1004.

During production, component and subassembly manufacturing 1006 and system integration 1008 of aircraft 1100 takes place. Thereafter, aircraft 1100 may go through certification and delivery 1010 in order to be placed in service 1012. While in service 1012 by a customer, aircraft 1100 is scheduled for routine maintenance and service 1014, which may include modification, reconfiguration, refurbishment, or other maintenance and service.

Each of the processes of aircraft manufacturing and service method 1000 may be performed or carried out by a system integrator, a third party, and/or an operator. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 11, an illustration of an aircraft in a form of a block diagram is depicted in which an illustrative example may be implemented. In this example, aircraft 1100 is produced by aircraft manufacturing and service method 1000 of FIG. 10 and may include airframe 1102 with plurality of systems 1104 and interior 1106. Examples of systems 1104 include one or more of propulsion system 1108, electrical system 1110, hydraulic system 1112, and environmental system 1114. Any number of other systems may be included.

Apparatuses and methods embodied herein may be employed during at least one of the stages of aircraft manufacturing and service method 1000. One or more illustrative examples may be manufactured or used during at least one of component and subassembly manufacturing 1006, system integration 1008, in service 1012, or maintenance and service 1014 of FIG. 10. For example, a void may be filled during at least one of component and subassembly manufacturing 1006 or maintenance and service 1014 of FIG. 10.

The illustrative examples provide composite repairs with improved mechanical properties. The illustrative examples provide composite repairs with directionally-oriented fibers within the resin.

Through exposure to an electromagnetic field, the electromagnetically steerable fibers can be oriented in a desired direction at least one of prior to introduction in the composite structure, during introduction to the composite structure, or after introduction to the composite structure and either prior to or during curing. The electromagnetically steerable fibers can be oriented prior to introduction to aid in reducing the viscosity of the suspension. The electromagnetically steerable fibers can be oriented during the introduction to the composite structure to move around three-dimensional obstacles in a void. The electromagnetically steerable fibers can be oriented during the introduction to the composite structure to break up blockages in the flow in the void. The electromagnetically steerable fibers can be oriented prior to or during the curing of the resin to provide mechanical properties in the composite repair.

The electromagnetically steerable fibers in the illustrative examples have a number of sizes and a number of materials. In some illustrative examples, the fibers are coated to aid in adhesion and/or electromagnetic sensitivity.

The electromagnetically steerable fibers are selected for size and quantity in a way that the suspension is still able to be applied through injection or another desirable method. The quantity of electromagnetically steerable fibers is sufficient to provide a mechanical benefit. The quantity of electromagnetically steerable fibers is low enough to provide a suspension with a viscosity low enough to introduce the suspension into the composite material through injection or other method.

An amount of electromagnetically steerable fibers (e.g., carbon or carbon nanotubes) is mixed with an adhesive forming a fiber-containing adhesive. The fiber-containing adhesive is applied (such as by injection) to a composite material repair site. An electromagnetic field is applied to the fiber-containing adhesive to orient the fibers in at least one pre-determined direction during at least one of prior to the applying, during the applying, or after the applying prior to or during the curing. The fiber-containing adhesive is cured to fix the electromagnetically steerable fibers in a number of desired directions.

Adding oriented fibers into a composite repair increases the mechanical capabilities of the repair. In some illustrative examples, oriented fibers increase the mechanical capabilities of the repair in the direction of the oriented fibers. Adding oriented fibers to increase mechanical capabilities lessens the knock-down of the composite repair. In some illustrative examples, at least a portion of the fibers are oriented in a Z-direction of the composite structure. In some illustrative examples, fibers in the Z-direction in the composite repair can provide a gain in durability and fatigue.

The illustrative examples provide methods and composite repairs that have a reduced "knock-down" applied. The illustrative examples provide methods and composite repairs that restore at least partial mechanical properties to the void. The illustrative examples provide a composite repair with structural capabilities.

Further, the disclosure comprises examples according to the following clauses:

Clause 1. A method of performing a composite repair comprising: forcing a fiber mixture through a composite structure and into a void of the composite structure, the fiber mixture comprising an adhesive and a plurality of electromagnetically steerable fibers; applying an electromagnetic field to the fiber mixture within the void of the composite structure; and curing the adhesive of the fiber mixture to form the composite repair with structural capabilities.

Clause 2. The method of Clause 1 further comprising: forming a number of injection holes in the composite structure to reach the void in the composite structure, wherein forcing the fiber mixture into the void comprises forcing the fiber mixture through at least one hole of the number of injection holes and into the void.

Clause 3. The method of Clause 1 or 2, wherein applying the electromagnetic field to the fiber mixture within the void comprises alternatingly applying the electromagnetic field as the fiber mixture is forced into the void.

Clause 4. The method of any of Clauses 1-3, wherein applying the electromagnetic field to the fiber mixture within the void comprises applying pressure to fibers lodged within the void as the fiber mixture is forced into the void.

Clause 5. The method of any of Clauses 1-4, wherein applying the electromagnetic field to the fiber mixture within the void comprises increasing filling of the void with the fiber mixture.

Clause 6. The method of any of Clauses 1-5, wherein applying the electromagnetic field to the fiber mixture comprises alternatingly activating the electromagnetic field as the fiber mixture is forced into the void, the method further comprising: alternatingly applying a second electromagnetic field within the void as the fiber mixture is forced into the void and when the electromagnetic field is not active, the second electromagnetic field having a different direction than the electromagnetic field.

Clause 7. The method of any of Clauses 1-6, wherein forcing the fiber mixture into the void comprises vacuum infusing the fiber mixture into the void.

Clause 8. The method of any of Clauses 1-7, wherein forcing the fiber mixture into the void comprises injecting the fiber mixture into the void.

Clause 9. The method of any of Clauses 1-8, wherein applying the electromagnetic field to the fiber mixture within the void comprises aligning at least a portion of the plurality of electromagnetically steerable fibers in a Z-direction in the void.

Clause 10. The method of any of Clauses 1-9, wherein applying the electromagnetic field to the fiber mixture within the void comprises orienting a first set of fibers of the plurality of electromagnetically steerable fibers in a first direction, the method further comprising: orienting a second set of fibers of the plurality of electromagnetically steerable fibers in a second direction.

Clause 11. The method of any of Clauses 1-10, wherein curing the adhesive of the fiber mixture is performed while a first set of fibers of the plurality of electromagnetically steerable fibers is in a first direction and while a second set of fibers of the plurality of electromagnetically steerable fibers is in a second direction.

Clause 12. The method of Clause 11, wherein the first set of fibers and the second set of fibers are different from each other based on at least one of a fiber length, a fiber type, or a fiber coating.

Clause 13. A method of performing a composite repair comprising: forcing a fiber mixture through at least one injection hole in a composite structure and into a void in the composite structure, the fiber mixture comprising an adhesive and a plurality of electromagnetically steerable fibers; applying an electromagnetic field to the fiber mixture within the void after introducing the fiber mixture into the void; and curing the adhesive of the fiber mixture to form the composite repair with structural capabilities.

Clause 14. The method of Clause 13, wherein applying the electromagnetic field comprises applying the electromagnetic field during curing.

Clause 15. The method of Clause 13 or 14, wherein applying the electromagnetic field comprises orienting a first set of fibers of the plurality of electromagnetically steerable fibers in a first direction, the method further comprising: applying a second electromagnetic field to the fiber mixture to orient a second set of fibers of the plurality of electromagnetically steerable fibers in a second direction.

Clause 16. The method of Clause 15, wherein the first set of fibers and the second set of fibers are different from each other based on at least one of a fiber length, a fiber type, or a fiber coating.

Clause 17. The method of any of Clauses 13-16, wherein applying the electromagnetic field orients only a portion of the plurality of electromagnetically steerable fibers.

Clause 18. The method of any of Clauses 13-17, wherein curing the adhesive of the fiber mixture is performed while a first set of fibers of the plurality of electromagnetically steerable fibers is in a first direction and while a second set of fibers of the plurality of electromagnetically steerable fibers is in a second direction.

Clause 19. The method of any of Clauses 13-18, wherein forcing the fiber mixture through the at least one injection hole comprises injecting the fiber mixture into the void using an injector, the method further comprising: electromagnetically steering the electromagnetically steerable fibers in the injector prior to injecting the fiber mixture into the void.

Clause 20. A composite structure with a composite repair having structural capabilities, the composite structure comprising: a plurality of cured composite plies with a void creating a separation within the plurality of cured composite plies; a number of injection holes connecting the void to an exterior of the plurality of cured composite plies; and a cured resin with a plurality of electromagnetically steerable fibers within the separation forming the composite repair and configured to transmit forces to composite plies in contact with the composite repair.

Clause 21. The composite structure of Clause 20, wherein the plurality of electromagnetically steerable fibers comprise a first set of fibers oriented in a Z-direction relative to the plurality of cured composite plies.

Clause 22. The composite structure of Clause 20 or 21, wherein the plurality of electromagnetically steerable fibers comprise a first set of fibers oriented in a first direction and a second set of fibers oriented in a second direction.

Clause 23. The composite structure of Clause 22, wherein the first set of fibers and the second set of fibers are different from each other based on at least one of a fiber length, a fiber type, or a fiber coating.

The description of the different illustrative examples has been presented for purposes of illustration and description and is not intended to be exhaustive or limited to the examples in the form disclosed. Many modifications and variations will be apparent to those of ordinary skill in the art. Further, different illustrative examples may provide different features as compared to other illustrative examples. The example or examples selected are chosen and described in order to best explain the principles of the examples, the practical application, and to enable others of ordinary skill in the art to understand the disclosure for various examples with various modifications as are suited to the particular use contemplated.

What is claimed is:

1. A method of performing a composite repair comprising:
forcing a fiber mixture through a composite structure and into a void of the composite structure, the fiber mixture comprising an adhesive and a plurality of electromagnetically steerable fibers;
applying an electromagnetic field to the fiber mixture within the void of the composite structure; and
curing the adhesive of the fiber mixture to form the composite repair with structural capabilities.

2. The method of claim 1 further comprising:
forming a number of injection holes in the composite structure to reach the void in the composite structure, wherein forcing the fiber mixture into the void comprises forcing the fiber mixture through at least one hole of the number of injection holes and into the void.

3. The method of claim 1, wherein applying the electromagnetic field to the fiber mixture within the void comprises alternatingly applying the electromagnetic field as the fiber mixture is forced into the void.

4. The method of claim 1, wherein applying the electromagnetic field to the fiber mixture within the void comprises applying pressure to fibers lodged within the void as the fiber mixture is forced into the void.

5. The method of claim 1, wherein applying the electromagnetic field to the fiber mixture within the void comprises increasing filling of the void with the fiber mixture.

6. The method of claim 1, wherein applying the electromagnetic field to the fiber mixture comprises alternatingly activating the electromagnetic field as the fiber mixture is forced into the void, the method further comprising:

alternatingly applying a second electromagnetic field within the void as the fiber mixture is forced into the void and when the electromagnetic field is not active, the second electromagnetic field having a different direction than the electromagnetic field.

7. The method of claim 1, wherein forcing the fiber mixture into the void comprises vacuum infusing the fiber mixture into the void.

8. The method of claim 1, wherein applying the electromagnetic field to the fiber mixture within the void comprises aligning at least a portion of the plurality of electromagnetically steerable fibers in a Z-direction in the void.

9. The method of claim 1, wherein applying the electromagnetic field to the fiber mixture within the void comprises orienting a first set of fibers of the plurality of electromagnetically steerable fibers in a first direction, the method further comprising:
orienting a second set of fibers of the plurality of electromagnetically steerable fibers in a second direction.

10. The method of claim 1, wherein curing the adhesive of the fiber mixture is performed while a first set of fibers of the plurality of electromagnetically steerable fibers is in a first direction and while a second set of fibers of the plurality of electromagnetically steerable fibers is in a second direction.

11. The method of claim 10, wherein the first set of fibers and the second set of fibers are different from each other based on at least one of a fiber length, a fiber type, or a fiber coating.

12. The method of claim 1, wherein forcing the fiber mixture into the void comprises injecting the fiber mixture into the void.

13. A method of performing a composite repair comprising:
forcing a fiber mixture through at least one injection hole in a composite structure and into a void in the composite structure, the fiber mixture comprising an adhesive and a plurality of electromagnetically steerable fibers;
applying an electromagnetic field to the fiber mixture within the void after introducing the fiber mixture into the void; and
curing the adhesive of the fiber mixture to form the composite repair with structural capabilities.

14. The method of claim 13, wherein applying the electromagnetic field comprises orienting a first set of fibers of the plurality of electromagnetically steerable fibers in a first direction, the method further comprising:
applying a second electromagnetic field to the fiber mixture to orient a second set of fibers of the plurality of electromagnetically steerable fibers in a second direction.

15. The method of claim 14, wherein the first set of fibers and the second set of fibers are different from each other based on at least one of a fiber length, a fiber type, or a fiber coating.

16. The method of claim 13, wherein applying the electromagnetic field orients only a portion of the plurality of electromagnetically steerable fibers.

17. The method of claim 13, wherein curing the adhesive of the fiber mixture is performed while a first set of fibers of the plurality of electromagnetically steerable fibers is in a first direction and while a second set of fibers of the plurality of electromagnetically steerable fibers is in a second direction.

18. The method of claim 13, wherein forcing the fiber mixture through the at least one injection hole comprises injecting the fiber mixture into the void using an injector, the method further comprising:

electromagnetically steering the electromagnetically steerable fibers in the injector prior to injecting the fiber mixture into the void.

19. The method of claim 13, wherein applying the electromagnetic field comprises applying the electromagnetic field during curing.

20. The method of claim 13, wherein applying the electromagnetic field to the fiber mixture within the void comprises aligning at least a portion of the plurality of electromagnetically steerable fibers in a Z-direction in the void.

\* \* \* \* \*